(12) United States Patent
Aoki et al.

(10) Patent No.: US 11,614,808 B2
(45) Date of Patent: Mar. 28, 2023

(54) ELECTRONIC PEN

(71) Applicant: Wacom Co., Ltd., Saitama (JP)

(72) Inventors: Shinya Aoki, Saitama (JP); Naoya Nishizawa, Saitama (JP); Toru Eguchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/471,013

(22) Filed: Sep. 9, 2021

(65) Prior Publication Data

US 2021/0405780 A1     Dec. 30, 2021

Related U.S. Application Data

(63) Continuation of application No. PCT/JP2020/003668, filed on Jan. 31, 2020.

(30) Foreign Application Priority Data

Apr. 3, 2019  (JP) .............................. JP2019-071085

(51) Int. Cl.
  *G06F 3/0354*  (2013.01)
  *G06F 3/038*   (2013.01)
  *G06F 3/044*   (2006.01)
  *G06F 3/046*   (2006.01)

(52) U.S. Cl.
  CPC ........ *G06F 3/03545* (2013.01); *G06F 3/0383* (2013.01); *G06F 3/044* (2013.01); *G06F 3/046* (2013.01)

(58) Field of Classification Search
  CPC ......... G06F 3/03545; B43K 8/00; B43K 5/00; B43K 7/00; B43K 31/00

USPC ........................................ 348/179; 178/19.01
  See application file for complete search history.

(56) References Cited

U.S. PATENT DOCUMENTS

| | | | |
|---|---|---|---|
| 6,616,365 B1 * | 9/2003 | Vann ..................... | B43K 24/023 401/117 |
| 2001/0028342 A1 | 10/2001 | Notagashira | |
| 2011/0096039 A1 * | 4/2011 | Liang ................... | G06F 3/03545 345/179 |
| 2011/0139519 A1 | 6/2011 | Liang et al. | |
| 2011/0219892 A1 | 9/2011 | Fukushima et al. | |

(Continued)

FOREIGN PATENT DOCUMENTS

| CN | 203077925 U | * | 7/2013 |
|---|---|---|---|
| JP | 4-4304 A | | 1/1992 |

(Continued)

OTHER PUBLICATIONS

International Search Report, dated Apr. 14, 2020, for International Application No. PCT/JP2020/003668, 3 pages.

*Primary Examiner* — Koosha Sharifi-Tafreshi
(74) *Attorney, Agent, or Firm* — Seed IP Law Group LLP (57) ABSTRACT

Provided is an electronic pen including a core body formed of a conductive material, the core body including a pen tip, and a tubular casing that is formed of a conductive material and has the core body disposed in a tip end part of the tubular casing. The tubular casing includes a plurality of tubular casings having a same axis. The tubular casing has a shortened state in which the tubular casings overlap each other. The tubular casing also has a lengthened state in which the tubular casings are extended and overlap each other less than the tubular casings overlap each other when the tubular casing has the shortened state.

12 Claims, 7 Drawing Sheets

(56) References Cited

U.S. PATENT DOCUMENTS

| | | | |
|---|---|---|---|
| 2013/0199311 A1 | 8/2013 | Horie et al. | |
| 2017/0097724 A1* | 4/2017 | Kobori | G06F 3/046 |
| 2017/0102792 A1* | 4/2017 | Aoki | G06F 3/0383 |
| 2018/0284909 A1* | 10/2018 | Laslo | G06F 3/03545 |
| 2019/0139393 A1* | 5/2019 | Kapron | G06F 3/016 |

FOREIGN PATENT DOCUMENTS

| | | |
|---|---|---|
| JP | 5-43231 U | 6/1993 |
| JP | 5-275283 A | 10/1993 |
| JP | 7-295722 A | 11/1995 |
| JP | 2001-209493 A | 8/2001 |
| JP | 2011-129086 A | 6/2011 |
| JP | 2011-186803 A | 9/2011 |
| JP | 2013-161307 A | 8/2013 |
| JP | 2014-165708 A | 9/2014 |
| JP | 2014-170273 A | 9/2014 |

\* cited by examiner

MIGRATION (TRANSFER) OF PEN DATA

ELECTRONIC PEN

BACKGROUND

Technical Field

The present disclosure relates to, for example, an electronic pen as a pen type position indicator used in conjunction with a position detecting device.

Background Art

An electronic pen is gripped by a user and is used for position indication on a position detecting sensor (coordinate detecting sensor) of a position detecting device. A position detection signal is exchanged between the electronic pen and the position detecting sensor by various systems such as an electromagnetic induction system, a capacitive system, or the like, and thereby a position indicated by the electronic pen on the sensor is detected by the position detecting device. Incidentally, an example of an input device formed by a position detecting sensor and an electronic pen of the electromagnetic induction system is disclosed in Japanese Patent Laid-Open No. Hei 7-044304. In addition, an example of an input device formed by a position detecting sensor and an electronic pen of the capacitive system is disclosed in Japanese Patent Laid-Open No. Hei 7-295722. Incidentally, the position detecting device includes the position detecting sensor and a position detecting circuit that is supplied with detection output from the position detecting sensor and that detects the indicated position.

In recent years, it has been increasingly often that, in school classes, company seminars, or the like, a display device including a large display screen of 65 inches or more and a position detecting sensor corresponding to this display screen is used in a state of being connected to a personal computer. In this case, a conventional electronic pen may be too short, so that flexible indicating operation may not be performed. In addition, the electronic pen indicates a position while coupled to the position detecting sensor by electromagnetic induction or coupled to the position detecting sensor by capacitance, as described above. When only this operation is observed, the electronic pen and the position detecting sensor can be considered to constitute a kind of switch. Development of new usage modes between the electronic pen and the position detecting sensor by utilizing such a characteristic is also desired.

BRIEF SUMMARY

In view of the above, it is an object of the present disclosure to realize an electronic pen whose utilization range can be expanded.

In order to solving the above-described problems, there is provided an electronic pen including a core body formed of a conductive material, the core body including a pen tip and a tubular casing that is formed of a conductive material and has the core body disposed in a tip end part of the tubular casing. The tubular casing includes a plurality of tubular casings having a same axis. The tubular casing has a shortened state in which the tubular casings overlap each other. Als, the tubular casing has a lengthened state in which the tubular casings are extended and overlap each other less than the tubular casings overlap each other when the tubular casing has the shortened state.

According to this electronic pen, the core body formed of a conductive material is attached to a tip end portion of the tubular casing formed of a conductive material. The tubular casing includes the plurality of tubular casings having the same axis. The plurality of tubular casings are set in a shortened state by overlapping each other, and is set in a lengthened state by being extended.

Thus, when the plurality of tubular casings are set in a shortened state by overlapping each other, the electronic pen has a length substantially similar to that of the conventional electronic pen, and can exert functions of the conventional electronic pen. In addition, when the plurality of tubular casings are set in a lengthened state by being extended, the electronic pen can indicate a position on a position detecting sensor, or give an on/off instruction through the position detecting sensor located at a distant position.

DETAILED DESCRIPTION

Main systems for position indication which systems are used in input devices including an electronic pen and a position detecting device include an electromagnetic induction system (electromagnetic resonance technology (EMR) system) and a capacitive system. The capacitive system includes a capacitive system (electrostatic (ES) system) capable of also detecting a touch by a finger of a hand of a user and an active capacitive system (active electrostatic (AES) system) that actively transmits a signal from an electronic pen.

An electronic pen according to the present disclosure can be configured as an electronic pen of any system. However, even when the electronic pen according to the present disclosure is configured as an electronic pen of any system, the external shape of the electronic pen can be configured in a substantially similar manner. The configuration of a casing part, in particular, is similar irrespective of the system of the electronic pen.

Accordingly, in the following, description will first be made of an external configuration of an electronic pen according to an embodiment, and thereafter description will be made of electronic pens according to embodiments configured in the capacitive system, the electromagnetic induction system, and the active capacitive system. Incidentally, in the following, the capacitive system will be described as an ES system, the electromagnetic induction system will be described as an EMR system, and the active capacitive system will be described as an AES system.

External Appearance of Electronic Pen According to Embodiment

Figure 1A:
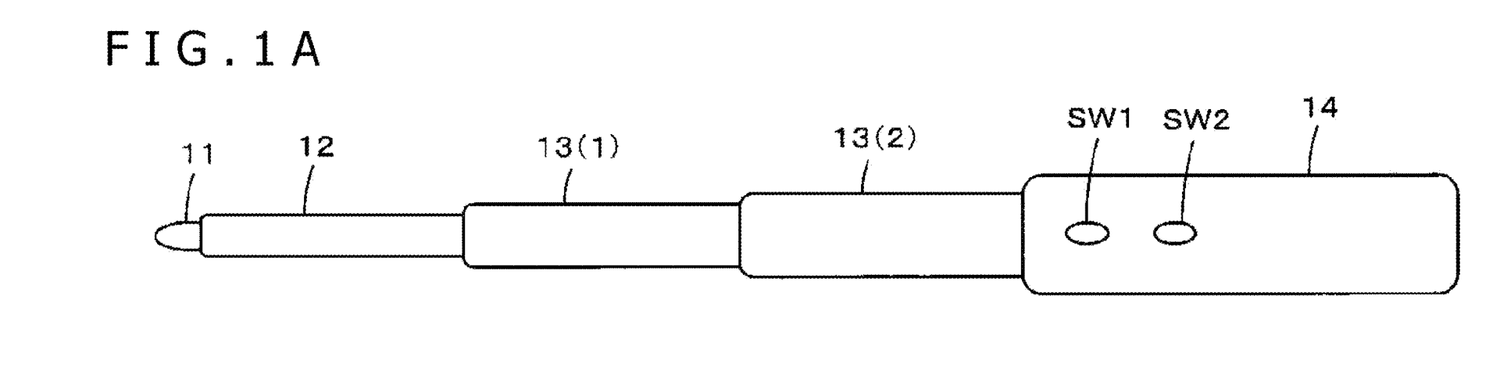
FIGS. 1A, 1B, and 1C are diagrams of assistance in explaining an external appearance of an electronic pen according to an embodiment of the present disclosure.
Figures 1B, 1C:
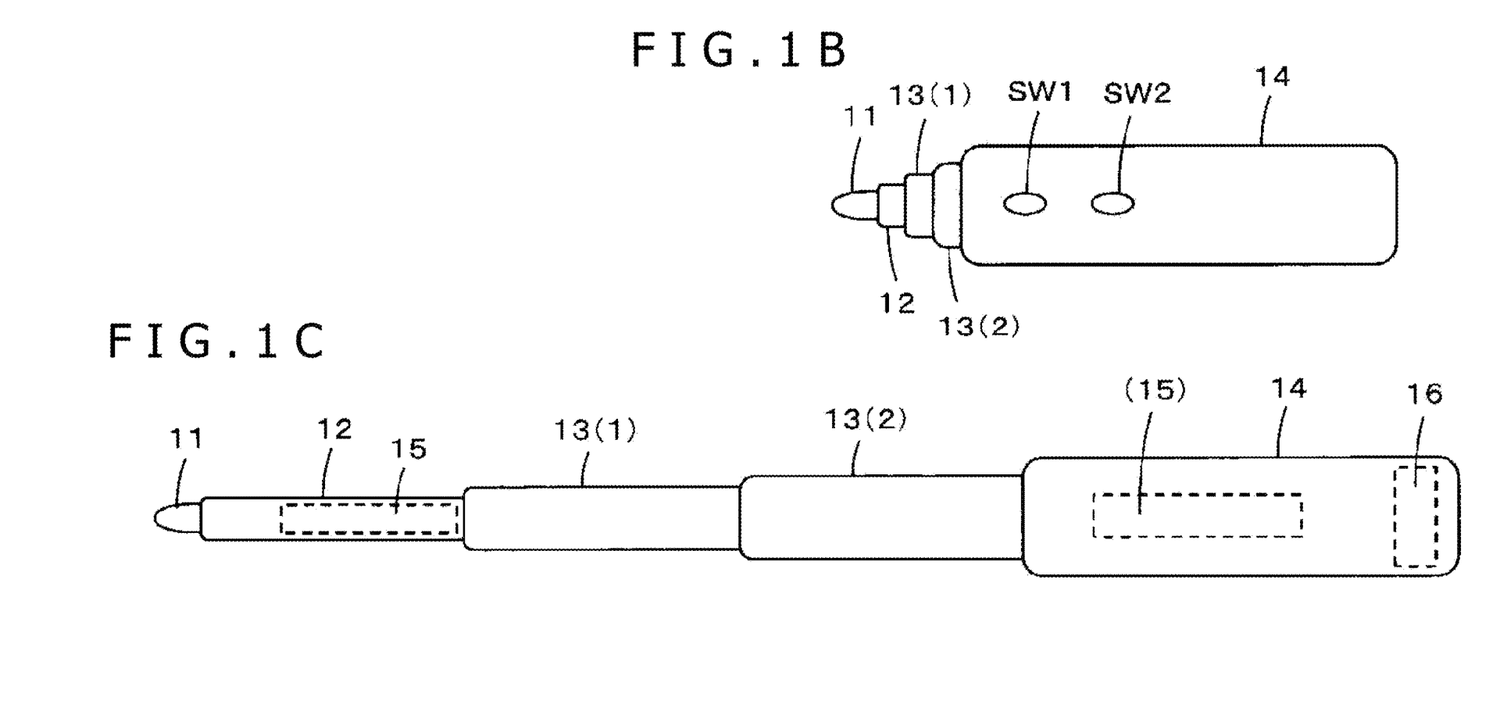

FIGS. 1A to 1C are diagrams of assistance in explaining an external appearance of an electronic pen according to an embodiment and an arrangement position of a circuit. The electronic pen according to the embodiment to be described in the following includes a core body 11 and a tubular casing having the core body 11 disposed in a tip end portion thereof. The tubular casing is of a cylindrical shape. The tubular casing is formed such that a plurality of tubular casings having a same axis (e.g., concentric) are coupled to each other. The plurality of tubular casings are set in a shortened state (short state) as depicted in FIG. 1B by being telescoped so as to overlap each other. In addition, when the plurality of tubular casings are extended to minimize parts overlapping each other, the plurality of tubular casings are set in a lengthened state (long state) as depicted in FIG. 1A. While the tubular casings are in the lengthened state (long state) shown in FIG. 1A they overlap less than while the tubular casings are in the shortened state (short state) shown in FIG. 1B.

The electronic pen in the example depicted in FIGS. 1A to 1C includes the core body 11 and four tubular casings 12, 13(1), 13(2), and 14. The tubular casing 12 is located in an innermost portion in the shortened state (FIG. 1B). The tubular casing 14 is located in an outermost portion in the shortened state (FIG. 1B). The side surface of the tubular casing 14 can be touched by the user. The tubular casing 13(1) is located on the outside of the tubular casing 12. The tubular casing 13(2) is located on the outside of the tubular casing 13(1).

That is, the tubular casing 12 is an innermost casing, the tubular casings 13(1) and 13(2) are one or more intermediate casings, and the tubular casing 14 is an outermost casing. In this case, relation between the diameters of the respective casings is such that Tubular Casing 12<Tubular Casing 13(1)<Tubular Casing 13(2)<Tubular Casing 14. Thus, the tubular casing 12 can be extended into the lengthened state as depicted in FIG. 1A, or telescoped into the shortened state.

As depicted in FIGS. 1A and 1B, what are called side switches SW1 and SW2 are provided on the side surface of the tubular casing 14. The side switches SW1 and SW2 correspond to a left button and a right button of what is called a mouse as a pointing device. Hence, when the side switch SW1 is depressed, a signal of a frequency A is transmitted through the core body 11, and, for example, the user can indicate a target position and position a cursor at the target position. In addition, when the side switch SW2 is depressed, a signal of a frequency B is transmitted through the core body 11, and, for example, a predetermined window can be displayed (opened) in the vicinity of the present cursor position.

Needless to say, other functions can also be assigned to the side switches SW1 and SW2. In addition, the functions performed according to operations of the side switches SW1 and SW2 can be changed according to a state of execution of a computer to which a display device including a position detecting device is connected. A circuit (e.g., on a circuit board) 15 for thus sending out signals according to operations of the side switches SW1 and SW2 is mounted in the tubular casing 12 or the tubular casing 14, as depicted in FIG. 1C. The circuit 15 includes a control integrated circuit (IC), a transmitting circuit, and the like.

The circuit 15 is mounted in the tubular casing 12 or the tubular casing 14 because there is no casing that continues in front of the tubular casing 12, or conversely, there is no casing that continues in the rear of the tubular casing 14, and in both cases, the circuit 15 is internally fixed easily. Incidentally, in the case of the ES system and the AES system, a power supply for making the circuit 15 function is necessary, and as depicted in FIG. 1C, for example, a portion for mounting a battery 16 is provided to an end part of the tubular casing 14 such that the battery can be mounted and demounted.

Incidentally, in the case of the example depicted in FIG. 1C, the battery 16 is assumed to be what is called a button type battery. However, in a case of using an AA battery or an AAA battery, it suffices to lengthen a part on the rear end side of the tubular casing 14. The external configuration as described above is substantially the same in any of the cases of the electronic pen of the ES system, the electronic pen of the EMR system, and the electronic pen of the AES system. In the following, description will be made of examples of configurations of the electronic pen of the ES system, the electronic pen of the EMR system, and the electronic pen of the AES system.

First Embodiment: Example of Configuration of Electronic Pen of ES System

Figure 2:
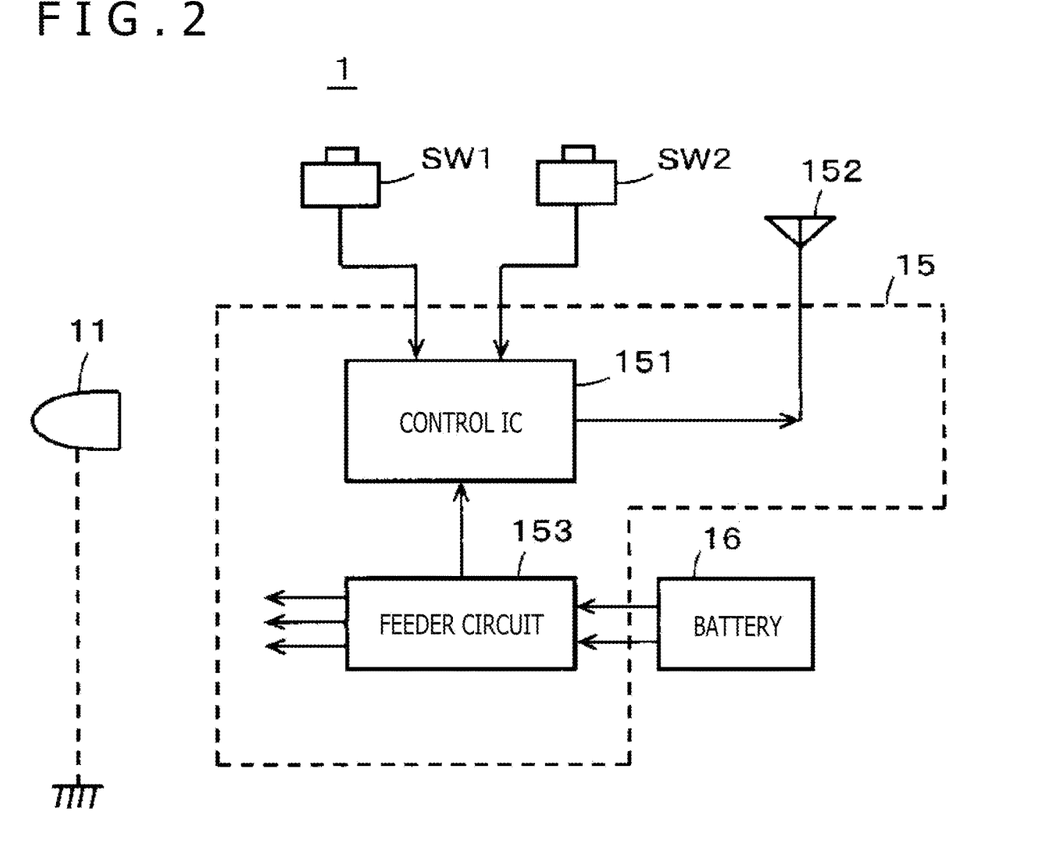
FIG. 2 is a diagram of assistance in explaining a configuration of an electronic pen according to a first embodiment of the present disclosure.

FIG. 2 is a diagram of assistance in explaining a configuration of an electronic pen 1 of the ES system as an electronic pen according to a first embodiment. In the case of the electronic pen 1 of the ES system, grounding is performed through the body of the user, and therefore the core body 11 and the tubular casings 12, 13(1), 13(2), and 14 of the electronic pen 1 are formed by a conductive material. Suppose that, for example, the core body 11 is formed by a conductive rubber, and each of the tubular casings 12, 13(1), 13(2), and 14 is formed by a metal such as iron, aluminum, or the like. This configuration enables the electronic pen according to the first embodiment to function as the electronic pen of the ES system.

That is, when the user holds the electronic pen 1 in a hand and brings the core body 11 into contact with a position detecting sensor, the electronic pen 1 is grounded through the user. Thus, a weak current flows between the position detecting sensor and the electronic pen 1, and a capacitance changes. This is detected by the position detecting sensor and a position detecting circuit. It is thereby possible to detect that an indication is made by the electronic pen 1 and detect a position indicated by the electronic pen 1.

Further, as depicted in FIG. 2, the core body 11 and the circuit 15 are not electrically connected to each other. Side switch information is transmitted to the position detecting sensor side through an antenna 152 connected to a control IC mounted in the circuit 15. In this case, the control IC 151 includes a short-range wireless communication circuit and is supplied with driving power from the battery 16 through a feeder circuit 153. In addition, the feeder circuit 153 supplies driving power also to necessary parts. Thus, when the side switch SW1 or the side switch SW2 is depressed, the control IC 151 can transmit side switch information to the position detecting sensor side through the antenna 152.

Thus, the electronic pen 1 functions as the electronic pen of the ES system both when the electronic pen 1 is telescoped and set in the shortened state as depicted in FIG. 1B and when the electronic pen 1 is extended and set in the lengthened state as depicted in FIG. 1A. In addition, when the side switch SW1 or SW2 is depressed, the electronic pen 1 can transmit a signal of a frequency corresponding to the operated side switch to the position detecting sensor side. Thus, an instruction can be issued to the position detecting sensor side according to operation of the side switch SW1 or SW2.

Figure 3:
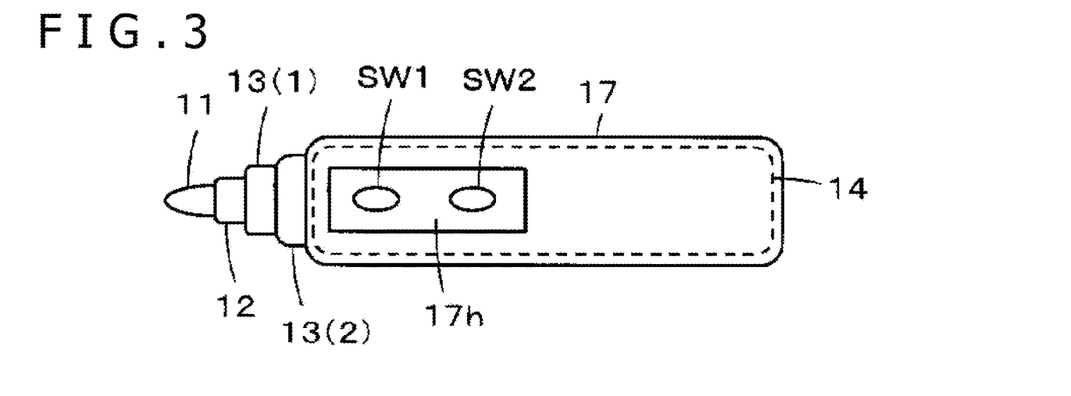
FIG. 3 is a diagram of assistance in explaining a case where a cover is used for an electronic pen according to an embodiment of the present disclosure.

FIG. 3 is a diagram of assistance in explaining a case where a cover is used for the electronic pen according to the embodiment. As depicted in FIG. 3, a cover 17 can be attached to the tubular casing 14 of the electronic pen 1 to improve aesthetic appearance or protect the casing. A non-conductive material such as wood, (natural or synthetic) leather, (natural or synthetic) rubber, cloth, or the like may be used as a material for the cover 17. In this case, when the entire external surface of the tubular casing 14 is covered by the cover 17, electric connection to the user is interrupted, so that grounding through the body of the user cannot be performed. Accordingly, an opening portion 17h is provided to the cover 17 to be able to maintain connection between a palm of a hand of the user or a finger of a hand of the user and the outer side surface of the tubular casing 14. In the case of the example depicted in FIG. 3, the opening portion 17h is provided in a part provided with the side switches SW1 and SW2. In this case, a more reliable electric connection to the body of the user can be secured by forming the side switches SW1 and SW2 themselves from a conductive material.

Second Embodiment: Example of Configuration of Electronic Pen of EMR System

Figure 4A:
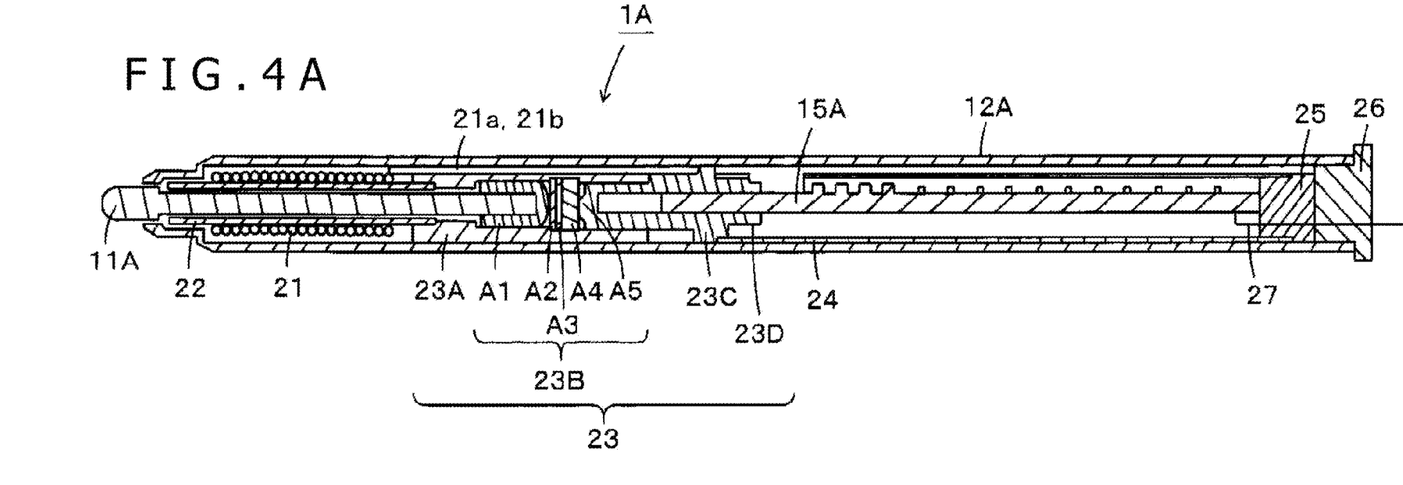
FIGS. 4A and 4B are diagrams of assistance in explaining a configuration of an electronic pen according to a second embodiment of the present disclosure.
Figure 4B:
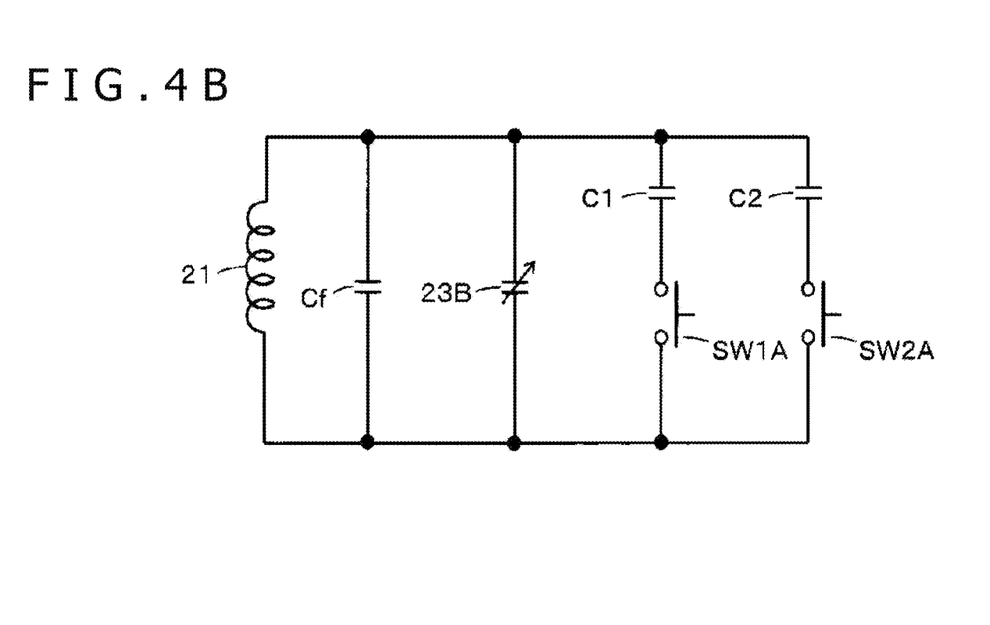

FIGS. 4A and 4B are diagrams of assistance in explaining a configuration of an electronic pen 1A of the EMR system as an electronic pen according to a second embodiment. FIG. 4A is a sectional view of the electronic pen 1A. FIG. 4B depicts an equivalent circuit of the electronic pen 1A. The configuration of the electronic pen 1A will first be described with reference to FIG. 4A. A tubular casing 12A corresponds to the tubular casing 12 depicted in FIGS. 1A to 1C and corresponds to the innermost casing having the shortest diameter. Various members for implementing electronic pen functions of the EMR system are mounted within the tubular casing 12A.

A core body 11A corresponds to the core body 11 depicted in FIGS. 1A to 1C. However, the core body 11A according to the present second embodiment is, for example, a rod-shaped core body formed of a resin or the like. An end part as a pen tip of the core body 11A has a diameter longer than the diameter of a shaft portion extending from the part to a rear end, and a tip end portion of the core body 11A is processed into a hemispherical shape such that the tip end portion can be smoothly moved on the operating surface of the position detecting sensor or the like.

A ferrite core 22 is, for example, obtained by forming, in a cylindrical ferrite material, an axial through hole having a predetermined diameter in a position including a center line in an axial direction. The core body 11A is inserted into the through hole of the ferrite core 22 so as to penetrate the ferrite core 22. That is, the core body 11A is longer than the axial length of the ferrite core 22. In addition, a shaft part of the core body 11A which shaft part is inserted into the through hole of the ferrite core 22 has a diameter slightly shorter than the diameter of the through hole, and is thus allowed to move slidingly in the axial direction within the through hole.

As depicted in FIG. 4A, a part of the ferrite core 22 which part has a predetermined length in the axial direction is a coil winding portion wound with a coil 21, and both ends of the ferrite core 22 are coil unwound portions not wound with the coil. Extending lines (conductor lines) 21a and 21b from end portions of the coil 21 wound around the ferrite core 22 are extended within the tubular casing 12A to a circuit 15A and are connected to a capacitor provided to the circuit 15A. The coil 21 and the capacitor on the circuit 15A thereby form a resonance circuit, which is coupled to a position detecting device by electromagnetic induction, so that the resonance circuit and the position detecting device can mutually transmit and receive signals (magnetic fields).

The circuit 15A corresponds to the circuit 15 depicted in FIGS. 1C and 1s included on a printed circuit board. The circuit 15A has, on an insulating board, various circuit parts such as a control IC functioning as a control circuit, a plurality of capacitors, and the like. These circuit parts are connected to each other to form an electronic circuit. As depicted in FIG. 4A, the circuit 15A is housed and protected within a board protecting pipe 24.

A connecting portion 23 including a molded portion 23A, a pen pressure detector portion 23B, a fitting portion 23C, and a connection terminal portion 23D is provided on a side of the core body 11A that is opposite from a side of the core body 11A that includes the pen tip of the core body 11A. The connecting portion 23 is a part that integrally connects a part formed by the coil 21, the ferrite core 22, and the core body 11A to the circuit 15A and the board protecting pipe 24. An end surface side of the molded portion 23A which end surface side faces the ferrite core 22 is provided with a recessed portion fitted with a coil unwound portion of the ferrite core 22.

Further, as depicted in FIG. 4A, provided within the molded portion 23A is pen pressure detector including a core body holding portion A1, a conductive rubber A2, a ring spacer A3, a dielectric A4, and a terminal member A5. These parts are sandwiched by the molded portion 23A and the fitting portion 23C to form the pen pressure detector portion 23B that detects a pen pressure.

That is, the conductive rubber (first electrode) A2 and the terminal member (second electrode) A5 sandwich the dielectric A4, thereby forming a variable capacitance capacitor. A conductive wire connected to the conductive rubber A2 and a conductive wire connected to the terminal member, for example, pass on the outside of the molded portion 23A and the fitting portion 23C, are connected to terminals of the connection terminal portion 23D, and are connected to the electronic circuit on the circuit 15A through the terminals of the connection terminal portion 23D. Thus, an electronic circuit on the circuit 15A can detect a pen pressure applied to the core body 11A as a change in capacitance of the pen pressure detector portion 23B having a configuration of a variable capacitance capacitor.

In the present example, the pen pressure detector portion 23B includes a pen pressure detector formed by the core body holding portion A1, the conductive rubber A2, the ring spacer A3, the dielectric A4, and the terminal member A5 is similar to a pen pressure detector of a well-known configuration described in Japanese Patent Laid-Open No. Hei 5-275283, for example. In addition, the pen pressure detector included in the pen pressure detector portion 23B can also be configured in a similar manner to a pen pressure detector of a well-known configuration described in Japanese Patent Laid-Open No. 2011-186803. In addition, a configuration which uses a semiconductor element that has a capacitance variable according to the pen pressure as disclosed in Japanese Patent Laid-Open No. 2013-161307, for example, is also possible.

The fitting portion 23C is a part fitted to the board protecting pipe 24. The fitting portion 23C is formed in, for example, a substantially cylindrical shape by a resin, a hard rubber, or the like. The fitting portion 23C is made integral with the molded portion 23A by being firmly fitted to the molded portion 23A. Thus, as also described above, the molded portion 23A and the fitting portion 23C sandwich the core body holding portion A1, the conductive rubber A2, the ring spacer A3, the dielectric A4, and the terminal member A5, and the pen pressure detector portion 23B constituted of these members is stably retained within the tubular casing 12A.

A recessed portion into which an end portion of the circuit 15A is fitted is provided on the inside of the fitting portion 23C. As depicted in FIG. 4A, the connection terminal portion 23D is a part including two upper and lower plate portions coupled to the fitting portion 23C. The plate portions sandwich a printed circuit board including the circuit 15A. Terminals to which the conductive wires from the conductive rubber A2 and the terminal member A5 described above are connected are arranged on one of these two plate portions, for example, the upper plate portion in FIG. 4A. Therefore, when the printed circuit board including the circuit 15A is inserted into the connection terminal portion 23D, the terminals are automatically connected to a terminal portion of the electronic circuit 15A.

The board protecting pipe 24 is formed by using a metal, a carbon material, a synthetic resin, or the like. The board protecting pipe 24 is a hard tubular member that is not bent or curved easily. The fitting portion 23C of the connecting portion 23 is inserted into a part in a predetermined range on the inside of the board protecting pipe 24 from a core body side opening portion. The fitting portion 23C and the part are thereby fitted to each other. Similarly, a pipe lid 25 is inserted into a part in a predetermined range on the inside of the board protecting pipe 24 from a rear end side opening portion. The pipe lid 25 and the part are thereby fitted to each other.

Thus, a part on a pen tip side in which part the core body 11A is inserted in the ferrite core 22 wound with the coil 21, the connecting portion 23, the board protecting pipe 24 housing the circuit 15A, and the pipe lid 25 are integrally connected to each other. A main part that implements functions of the electronic pen of the EMR system is thereby formed. This main part is housed in the tubular casing 12A. A connecting member 26 for connecting the tubular casing 12A to the tubular casing 13(1) is attached so as to be fitted to an opening portion on the rear end side.

Then, the tubular casing 12A is loaded from the rear end side of the tubular casing 13(1) into the tubular casing 13(1). The tubular casing 13(1) loaded with the tubular casing 12A is loaded from the rear end side of the tubular casing 13(2) into the tubular casing 13(2). The tubular casing 13(2) loaded with the tubular casing 12A and the tubular casing 13(1) is loaded from the rear end side of the tubular casing 14 into the tubular casing 14. Thus, the expanding and contracting electronic pen 1A of the EMR system, the electronic pen 1A corresponding to that depicted in FIGS. 1A to 1C, can be constructed.

Incidentally, because the electronic pen of the EMR system exchanges signals (magnetic fields) with the position detecting device by electromagnetic induction, the electronic pen of the EMR system does not need a driving power supply, and therefore does not include a battery. In addition, also in the case of the electronic pen of the EMR system, the tubular casing 14 is provided with side switches SW1A and SW2A as in the case depicted in FIGS. 1A and 1B. The side switches SW1A and SW2A are, for example, connected to the circuit 15A by a conductive wire 27 in FIG. 4A.

Functions of the electronic pen 1A will next be described with reference to an equivalent circuit of the electronic pen 1A depicted in FIG. 4B. In the case of the electronic pen 1A of the EMR system, the coil 21 and a capacitor Cf included in the circuit 15A constitute a resonance circuit, so that signals (magnetic fields) can be transmitted and received to and from the position detecting device by electromagnetic induction. Further, the pen pressure detector portion 23B including a pen pressure detector having a configuration of a variable capacitance capacitor is connected in parallel with the resonance circuit. It is thereby possible to change the phase of a signal (magnetic field) to be transmitted to the position detecting device, according to a detected pen pressure. Therefore, it is also possible to transmit pen pressure information.

Further, as depicted in FIG. 4B, a part obtained by connecting a capacitor C1 and the side switch SW1A in series with each other and a part obtained by connecting a capacitor C2 and the side switch SW2A in series with each other are connected in parallel with the resonance circuit. It is thereby possible to change the phase of the signal (magnetic field) to be transmitted also by turning on/off the side switches SW1A and SW2A. Therefore, it is also possible to make a notification of an operation of each of the side switches SW1A and SW2A.

Incidentally, because signals (magnetic fields) are mutually transmitted and received by electromagnetic induction coupling between the resonance circuit on the electronic pen side and the sensor, the tubular casing 12A needs to be formed of a resin or the like rather than a conductive material. A resin part may be only a tip end part of the tubular casing 12A.

Third Embodiment: Example of Configuration of Electronic Pen of AES System

Figure 5A:
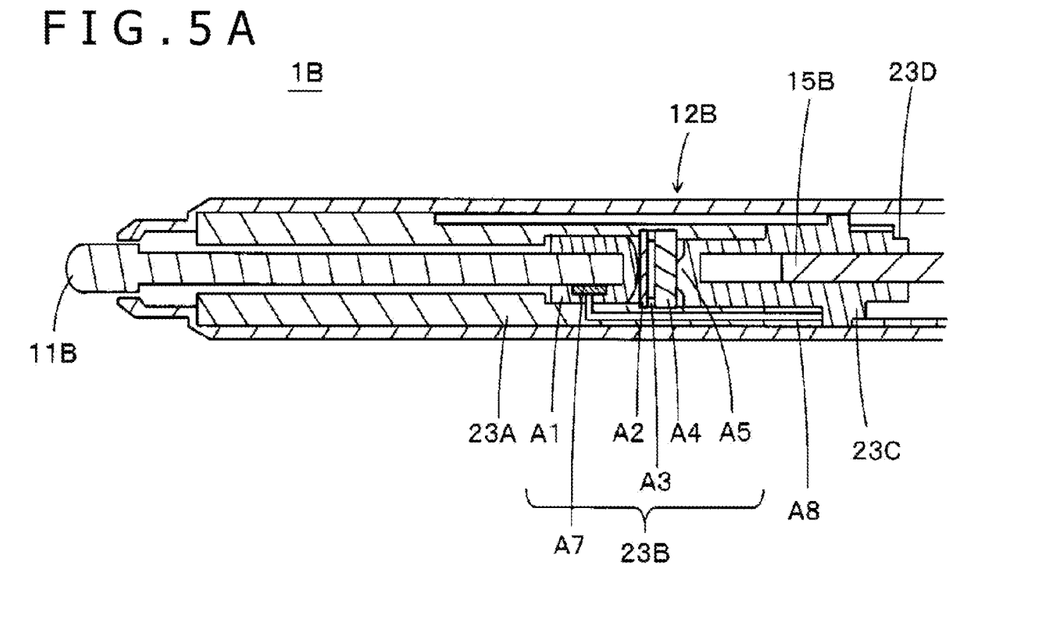
FIGS. 5A and 5B are diagrams of assistance in explaining a configuration of an electronic pen according to a third embodiment of the present disclosure.
Figure 5B:
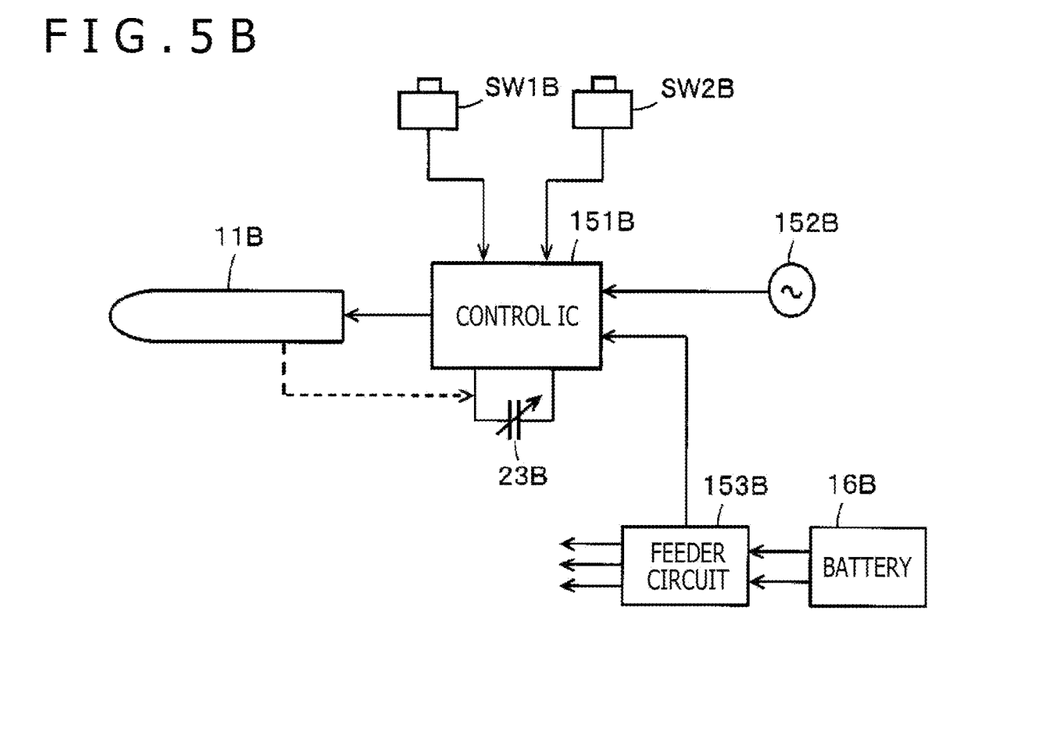

FIGS. 5A and 5B are diagrams of assistance in explaining a configuration of an electronic pen 1B of the AES system as an electronic pen according to a third embodiment. FIG. 5A is a sectional view of the pen tip side of the electronic pen 1B. FIG. 5B depicts a general configuration of the electronic pen 1B. The configuration of the electronic pen 1B will first be described with reference to FIG. 5A. A tubular casing 12B corresponds to the tubular casing 12 depicted in FIGS. 1A to 1C and corresponds to the innermost casing having the shortest diameter. Various members for implementing electronic pen functions of the AES system are mounted within the tubular casing 12B.

As depicted in FIG. 5A, the electronic pen 1B of the AES system in the present example also has a configuration basically similar to that in the case of the electronic pen 1A of the EMR system, the electronic pen 1A being depicted in FIGS. 4A and 4B. However, in the case of the electronic pen 1B of the AES system, a signal is transmitted to the position detecting device through a core body 11B, and therefore the core body 11B has conductivity. The core body 11B is, for example, formed by using a metal, a synthetic resin mixed with a carbon material, or the like.

As depicted in FIG. 5A, in the case of the electronic pen 1B of the AES system, an electrode A7 is provided on the inside of the core body holding portion A1 such that the core body 11B inserted in the core body holding portion A1 is in contact with the electrode A7. A conductor A8 is extended from the electrode A7 and is connected to an oscillating circuit included in a circuit 15B. Thus, a signal from the oscillating circuit included in the circuit 15B is transmitted to the position detecting device through the core body 11B. Incidentally, a configuration may be adopted in which the core body holding portion A1 itself is, for example, formed by a material having conductivity such as a conductive rubber, a resin mixed with carbon, or the like, and the core body holding portion A1 made to have conductivity and the oscillating circuit are connected to each other by a conductive wire.

There is neither a coil nor a ferrite core in the present example. Therefore, in the case of the electronic pen 1B, the molded portion 23A is extended to the pen tip side and abuts against an end surface of a tapered part. The core body 11B, the molded portion 23A, the pen pressure detector portion 23B, the fitting portion 23C, the connection terminal portion 23D, the electrode A7 and the conductor A8, the circuit 15B, the board protecting pipe 24, the pipe lid 25 not depicted, and the connecting member 26 are housed within the tubular casing 12B to form the electronic pen 1B.

Thus, as in the case of the electronic pen 1A of the EMR system described with reference to FIGS. 4A and 4B, the tubular casing 12B incorporating electronic pen functions of the AES system is combined with the tubular casings 13(1), 13(2), and 14, so that the expanding and contracting electronic pen 1B of the AES system, the electronic pen 1B corresponding to that depicted in FIGS. 1A to 1C, can be constructed.

Functions of the electronic pen 1B will next be described with reference to a general configuration of the electronic pen 1B in FIG. 5B. As depicted in FIG. 5B, an oscillating circuit 152B is connected to the core body 11B through a control IC 151B. The control IC 151B is supplied with driving power from a battery 16B through a feeder circuit 153B. In addition, the feeder circuit 153B supplies driving power also to necessary parts. In addition, the control IC 151B is connected with the pen pressure detector portion 23B having a configuration of a variable capacitance capacitor in addition to side switches SW1B and SW2B.

Thus, the control IC 151B can transmit pen pressure information detected by the pen pressure detector included in the pen pressure detector portion 23B after including the pen pressure information in a signal to be transmitted from the core body 11B by, for example, changing frequency on the basis of a reference signal from the oscillating circuit 152B. In addition, in a case where the side switch SW1B or SW2B is depressed, the control IC 151B can form a signal of a target frequency on the basis of the reference signal from the oscillating circuit 152B, send out the signal from the core body 11, and thereby transmit the signal to the position detecting sensor side.

[Usage Mode of Electronic Pens 1, 1A, and 1B]

Figure 6:
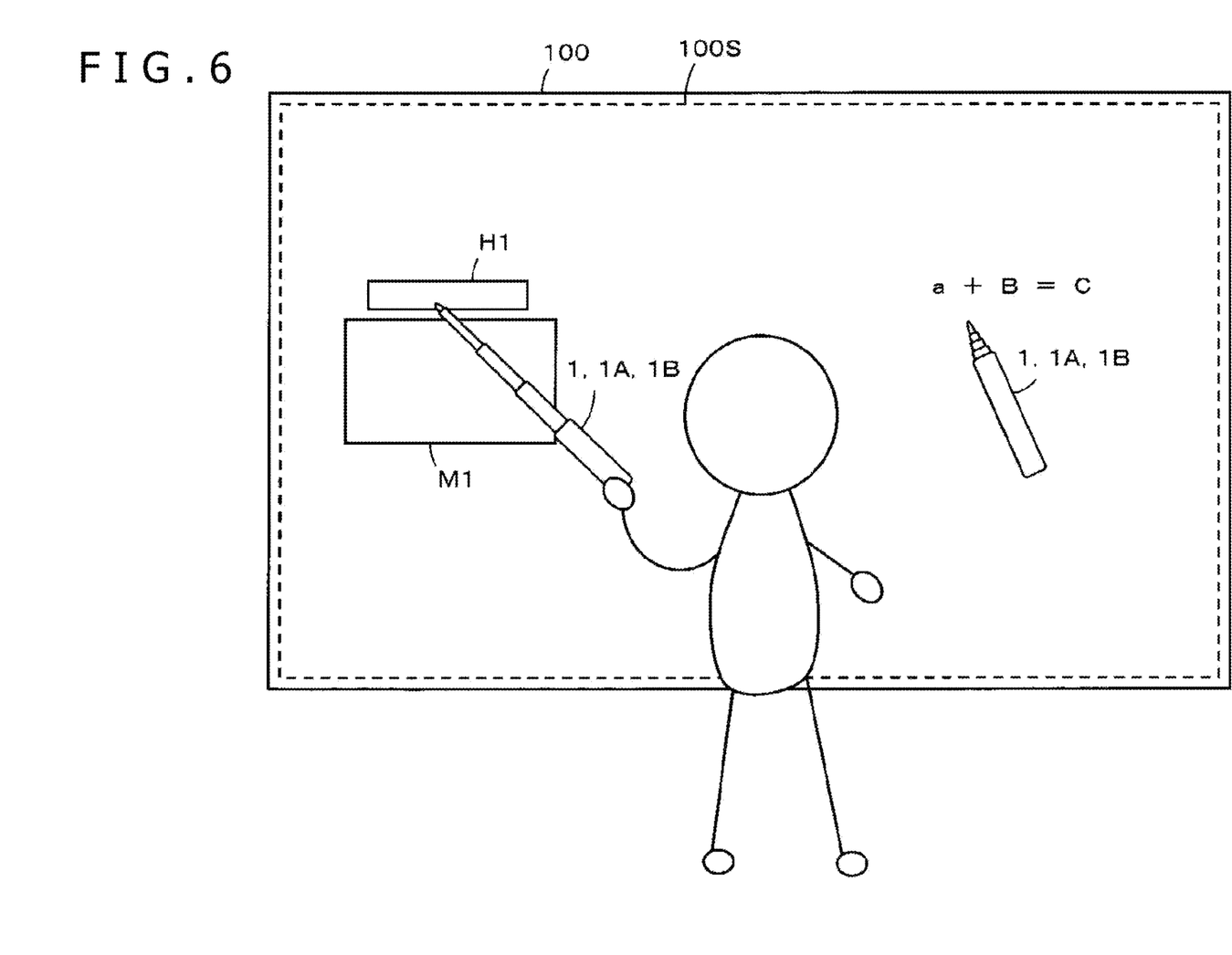
FIG. 6 is a diagram of assistance in explaining a usage mode of the electronic pens according to the embodiments of the present disclosure.

FIG. 6 is a diagram of assistance in explaining a usage mode of the electronic pens 1, 1A, and 1B according to the embodiments. FIG. 6 is a diagram of assistance in explaining a usage mode in a case where a display device including a large display screen 100 and provided with a position detecting sensor 100S corresponding to the entire surface of the display screen 100 is used in a state of being connected to a personal computer. In this case, the display device can be used as a substitute for what is called a blackboard or a whiteboard. Incidentally, whether the electronic pen to be used is the electronic pen 1 of the ES system, the electronic pen 1A of the EMR system, or the electronic pen 1B of the AES system is determined according to whether the position detecting sensor mounted in the display device is that of the capacitive system, the electromagnetic induction system, or the active capacitive system.

As depicted on the left side of FIG. 6, when the pen tip of the electronic pen 1, 1A, or 1B is brought close to the position detecting sensor 100S in a state in which the electronic pen is extended (lengthened state), a cursor can be positioned at a position indicated by the pen tip, and a predetermined display H1 can be displayed. Suppose that the pen tip of the electronic pen 1, 1A, or 1B is similarly brought close to the position detecting sensor 100S in a state in which the electronic pen is extended, that the cursor is positioned at a position indicated by the pen tip, and that further the side switch SW1, SW1A, or SW1B is depressed. In this case, a predetermined window M1 can be displayed (opened) with the indicated position as a reference, and an intended selection item can be selected by indicating the selection item. Thus, the electronic pens 1, 1A, and 1B can be configured to combine functions of what is called a pointer and functions of a pointing device.

In addition, as depicted on the right side of FIG. 6, a character or a figure can be drawn when the pen tip of the electronic pen 1, 1A, or 1B is brought into contact with the position detecting sensor 100S and operated so as to be moved in a state in which the electronic pen is telescoped (shortened state). Thus, the electronic pens 1, 1A, and 1B can be used as a writing instrument such as what is called a chalk, a marker for a whiteboard, or the like.

Figure 7:
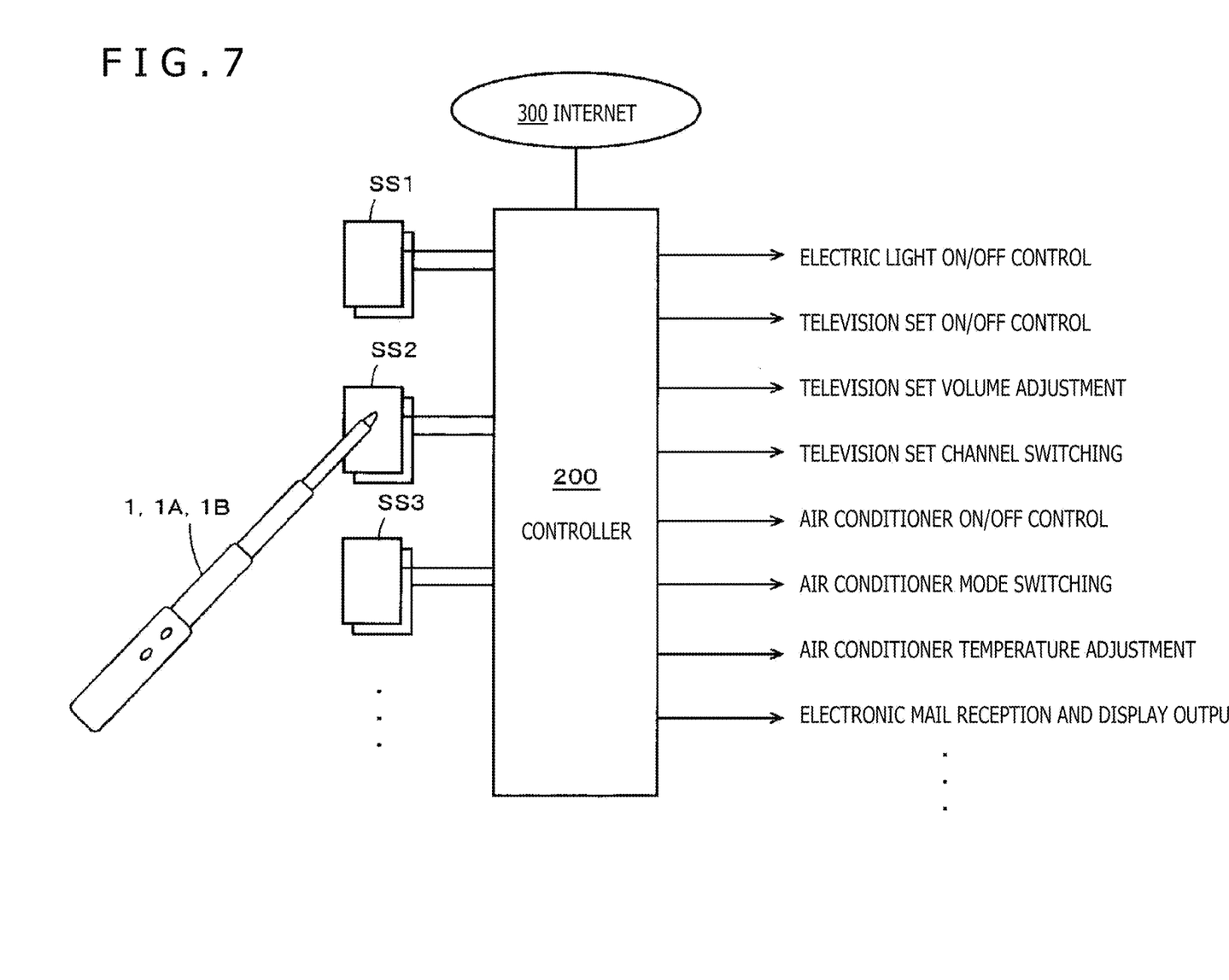
FIG. 7 is a diagram of assistance in explaining another usage mode of the electronic pens according to the embodiments of the present disclosure.

FIG. 7 is a diagram of assistance in explaining another usage mode of the electronic pens 1, 1A, and 1B according to the embodiments. In FIG. 7, a plurality of position detecting sensors SS1, SS2, SS3, . . . are provided to a surface facing the user, such as an indoor wall, a column, the upper surface of a table, or the like, and these position detecting sensors are connected to a controller 200. As the position detecting sensors SS1, SS2, SS3, . . . , there are position detecting sensors for the ES system, for EMR, and for AES. Hence, whether the electronic pen to be used is the electronic pen 1 for ES, the electronic pen 1A for EMR, or the electronic pen 1B for AES is determined according to the systems of the provided position detecting sensors.

In addition, the position detecting sensors SS1, SS2, SS3, . . . are each assigned a function in advance. The functions to be assigned include various functions such as the turning on/off of an electric light, the turning on/off of a television set, adjustment of the volume of the television set, the changing of a channel of the television set, the turning on/off of an air conditioner, the changing of a mode of the air conditioner, adjustment of the temperature of the air conditioner, and reception and display of an electronic mail.

Though not depicted, the controller 200 includes a central processing unit (CPU) including a processor, a read only memory (ROM), a random access memory (RAM), a non-volatile memory, a remote control signal transmitter, a communication I/F, a connection I/F to an external apparatus, and the like. The controller 200 is also connected to the Internet 300 through the communication I/F.

Suppose that a position on a position detecting sensor thus assigned the electric light on/off function, for example, is indicated by the electronic pen 1, 1A, or 1B of the corresponding system. The controller 200 is notified of the indication, by an output signal from the position detecting sensor. The controller 200 can thereby turn on/off the electric light by transmitting a remote control signal for the electric light from the remote control signal transmitter.

Similarly, an intended function can be performed by indicating a position detecting sensor assigned the intended function with the electronic pen 1, 1A, or 1B of the corresponding system. That is, processing such as the turning on/off of the television set, adjustment of the volume of the television set, the changing of a channel of the television set, the turning on/off of the air conditioner, the changing of a mode of the air conditioner, adjustment of the temperature of the air conditioner, and reception and display of an electronic mail can be performed by a simple operation of indicating a position detecting sensor with an electronic pen.

Hence, the electronic pens 1, 1A, and 1B can be implemented which function as an operation indicator for a switch implemented by a position detecting sensor. In this case, indicating operation on the position detecting sensors SS1, SS2, SS3, . . . cannot be performed unless the electronic pens 1, 1A, and 1B are used. In the case of the position detecting sensor of the EMR system, in particular, even when the user touches the position detecting sensor with a finger, this touch cannot be detected. It is therefore possible to perform reliable operation using the electronic pens 1, 1A, and 1B, and consequently prevent erroneous operation.

Incidentally, in a case where increasing and decreasing adjustments such as adjustment of the volume of the television set and adjustment of the temperature of the air conditioner are involved, for example, it suffices to provide a position detecting sensor for increase and a position detecting sensor for decrease. Needless to say, an indication region of one position detecting sensor may be divided into two regions, and one region may be used for increase and the other region may be used for decrease.

In addition, in the case of the position detecting sensor for turning on/off the electric light, for example, it is not necessary to identify a precise indicated position. Thus, the position detecting sensor for turning on/off the electric light does not need to be a position detecting sensor in which a plurality of line electrodes or loop electrodes are arranged, but a position detecting sensor capable of detecting whether or not an indication is performed suffices. Hence, in theory, such a position detecting sensor can be configured by two intersecting line electrodes or two intersecting loop electrodes. Needless to say, in order to increase detection accuracy, it is desirable to configure a position detecting sensor by using a plurality of line electrodes or a plurality of loop electrodes.

[Information Receiving and Retaining Function]

Figure 8A:
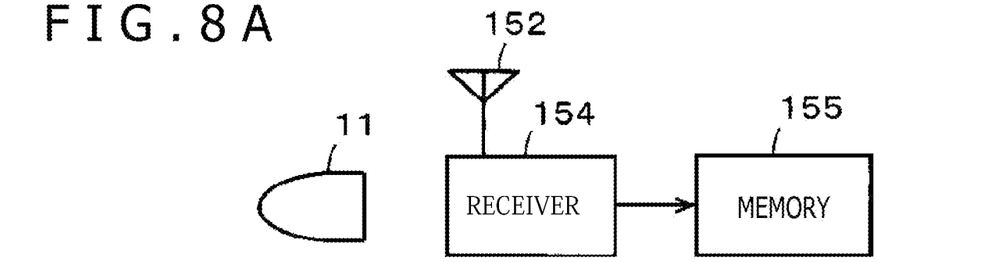
FIGS. 8A, 8B, and 8C are diagrams of assistance in explaining a case where the electronic pens include a memory.
Figure 8B:
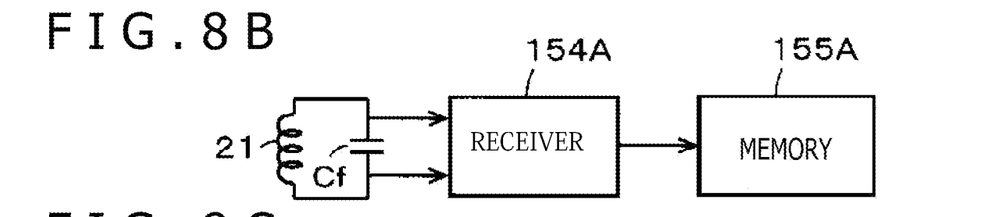
Figure 8C:
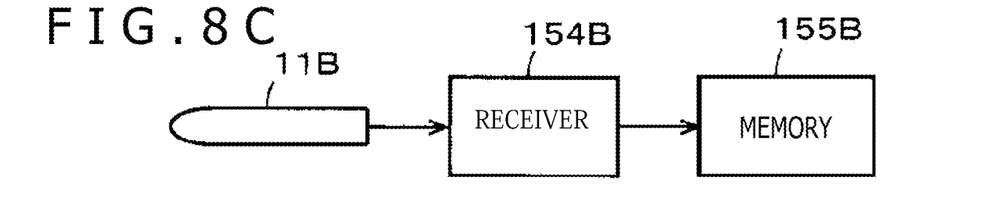

FIGS. 8A to 8C are diagrams of assistance in explaining a case where the electronic pens include a memory. As described above, the electronic pens 1, 1A, and 1B have a function of transmitting information through the antenna 152, the core body 11B, or the coil 21. Considered conversely, the electronic pens 1, 1A, and 1B can also receive information from the position detecting device or the like through the antenna 152, the core body 11B, or the coil 21. Accordingly, memories 155, 155A, and 155B are included in the electronic pens 1, 1A, and 1B in advance.

As depicted in FIG. 8A, a receiver 154 is provided. The receiver 154 captures information received through the antenna 152, in a state in which the receiver 154 is electrically disconnected from the core body 11, and records the information in the memory 155. Similarly, as depicted in FIG. 8B, a receiver 154A that captures information received through the resonance circuit including the coil 21 and the capacitor Cf and records the information in the memory 155A is provided between the resonance circuit and the memory 155A. Similarly, as depicted in FIG. 8C, a receiver 154B that captures information received through the core body 11B and records the information in the memory 155B is provided between the core body 11B and the memory 155B. Thus, the electronic pens 1, 1A, and 1B can be provided with a function of capturing information from the outside and recording the information in the memories 155, 155A, and 155B.

Incidentally, the receiver 154 in FIG. 8A can, for example, be implemented as a short-range wireless communication function of the Bluetooth (registered trademark) standard or the like. Incidentally, functions of the receiver 154 can be provided as functions of the control IC 151 depicted in FIG. 2. Needless to say, a short-range wireless communication circuit that implements a short-range wireless communication function can be configured so as to be provided separately from the control IC 151. In addition, the electronic pens 1A and 1B can be additionally provided with a short-range wireless communication function separately from the core body 11B or the coil 21.

Figure 9:
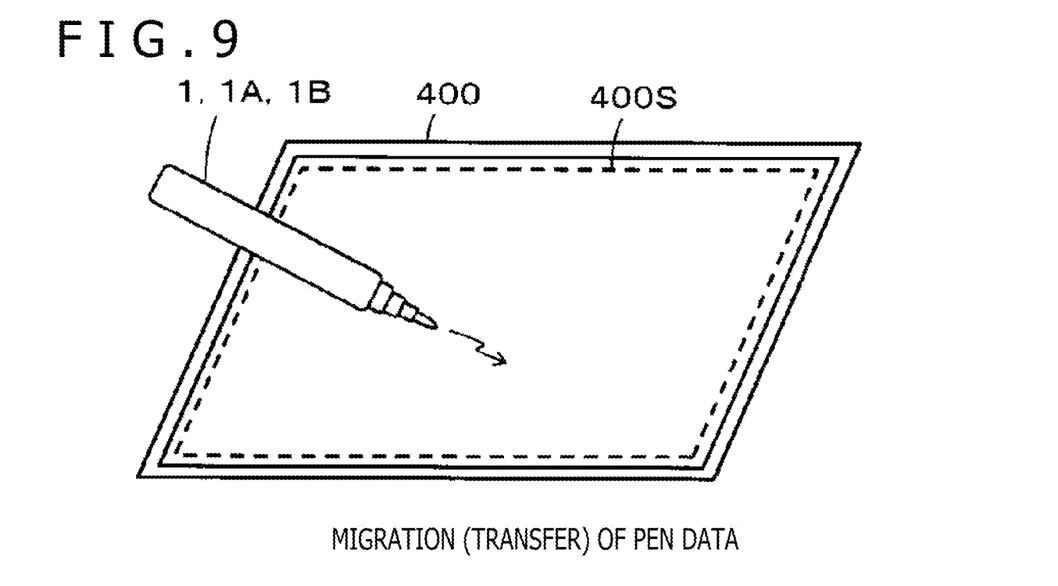
FIG. 9 is a diagram of assistance in explaining a usage mode of the electronic pens including a memory.

FIG. 9 is a diagram of assistance in explaining a usage mode of the electronic pens including a memory. As depicted in FIG. 9, information captured by using FIGS. 8A to 8C is transmitted to an information terminal 400 including a position detecting sensor 400S after the information is included in a position indication signal, for example. The information collected by the electronic pens 1, 1A, and 1B can be thereby transferred to the information terminal 400. Various kinds of information are conceivable as information transferred in this manner.

To cite an example, in the usage mode described with reference to FIG. 6, the electronic pen 1, 1A, or 1B is provided with information regarding the position on the display screen 100 which position is indicated through the electronic pen 1, 1A, or 1B or a character or a figure input through the electronic pen 1, 1A, or 1B, and stores and retains the information in the memory 155, 155A, or 155B of the electronic pen 1, 1A, or 1B. Then, the information can be provided to the information terminal 400 as a tablet personal computer (PC), for example, and checked again such that the contents of a lesson or a lecture given are reproduced.

In addition, in the usage mode described with reference to FIG. 7, the electronic pen 1, 1A, or 1B is provided with information indicating a function assigned to a position detecting sensor indicated through the electronic pen 1, 1A, or 1B. The provided information and a present time provided by a clock circuit included in the electronic pen 1, 1A, or 1B are stored and retained in the memory 155, 155A, or 155B of the electronic pen 1, 1A, or 1B in association with each other. Then, for example, the information can be provided to the information terminal 400 as a tablet PC, and a history of operations performed through the electronic pen 1, 1A, or 1B can be checked, for example.

Effects of Embodiments

The electronic pens 1, 1A, and 1B according to the foregoing embodiments can realize electronic pens that combine functions of a pointer used by a teacher or a lecturer during a lesson, a lecture, or the like and functions of a pointing device such as a mouse of a personal computer or the like. In addition, the electronic pens 1, 1A, and 1B according to the foregoing embodiments can realize electronic pens that function as an operation indicator for a switch having a configuration of a position detecting sensor. It is thereby possible to realize an electronic pen that can not only input information to an information terminal including a position detecting device but also expand a range of utilization thereof.

Modifications

Incidentally, the electronic pens 1, 1A, and 1B according to the foregoing embodiments have a four-stage configuration as depicted in FIGS. 1A to 1C, but are not limited to this. Electronic pens having a multiple-stage configuration of two stages or more can be constructed. In addition, the thicknesses and lengths of the plurality of tubular casings 12, 13(1), 13(2), . . . , 14 constituting the electronic pens can be set to be various thicknesses and lengths according to a usage purpose or the like.

In addition, the tubular casings 12, 13(1), 13(2), . . . , 14 are not limited to a cylindrical shape, but may be in the shape of a polygonal prism. In short, an electronic pen having multiple stages can be constructed by combining a plurality of tubular casings having shapes whose end surfaces have similar shapes. Hence, an electronic pen having a multiple-stage configuration can also be constructed by using tubular bodies whose end surfaces have star shapes or elliptic shapes.

In addition, in a case where the circuit 15 is provided in the tubular casing 12, the circuit 15 needs to be electrically connected to the side switches SW1 and SW2. In addition, in a case where the circuit 15 is provided in the tubular casing 14, the circuit 15 needs to be electrically connected to the core body 11. In these cases, within the tubular casings 12, 13(1), 13(2), and 14, connection needs to be established in a manner in which a connecting conductor is not broken even when the electronic pen is telescoped or extended. The same is true for the electronic pen 1A of the EMR system and the electronic pen 1B of the AES system.

Therefore, conductor patterns that are electrically connected to one another in both a case where the electronic pen is telescoped and a case where the electronic pen is extended may be formed on the outer side surface of the tubular casing 12, the inner side surfaces and the outer side surfaces of the tubular casings 13(1) and 13(2), and the inner side surface of the tubular casing 14. Needless to say, connection may be established by conductive wire.

In addition, the outer side surfaces of the tubular casings 12, 13(1), 13(2), . . . , 14 are susceptible of various kinds of processing and decorations such as making a woodgrain print, imparting a color, and the like.

It is to be noted that the embodiments of the present disclosure are not limited to the foregoing embodiments, and that various changes can be made without departing from the spirit of the present disclosure.

What is claimed is:

1. An electronic pen comprising:
a core body formed of a conductive material, the core body including a pen tip; and
a tubular casing that is formed of a conductive material and has the core body disposed in a tip end part of the tubular casing,
the tubular casing including a plurality of tubular casings having a same axis,
the tubular casing having a shortened state in which the tubular casings overlap each other, and
the tubular casing having a lengthened state in which the tubular casings are extended and overlap each other less than the tubular casings overlap each other when the tubular casing has the shortened state,
wherein the tubular casing includes an innermost casing, one or more intermediate casings located outside of the innermost casing, and an outermost casing located outside of the one or more intermediate casings,
wherein a cover formed of a non-conductive material is provided on an outer side surface of the outermost casing, and
wherein a connecting portion is provided on the cover, the connecting portion being electrically connected to the outermost casing.

2. The electronic pen according to claim 1, further comprising:
a circuit connected to the core body, wherein the circuit, in operation, transmits a desired signal from the core body, and
wherein a switch is connected to the circuit,
wherein the switch is disposed on an outer side surface of the tubular casing in an end portion of the tubular casing on a side of the tubular casing that is opposite from a pen tip side of the tubular casing when the tubular casing is in the lengthened state, and
wherein the switch includes a connecting portion that is electrically connected to the tubular casing.

3. The electronic pen according to claim 1, further comprising:
a circuit connected to the core body, wherein the circuit, in operation, transmits a desired signal from the core body, and
wherein the circuit is disposed in an end portion of the tubular casing on a pen tip side of the tubular casing or in an end portion of the tubular casing on a side of the tubular casing that is opposite from the pen tip side of the tubular casing when the tubular casing is in the lengthened state.

4. The electronic pen according to claim 3, wherein
a switch is connected to the circuit, and
the switch is disposed on an outer side surface of the tubular casing in the end portion of the tubular casing on the side of the tubular casing that is opposite from the pen tip side of the tubular casing when the tubular casing is in the lengthened state.

5. An electronic pen comprising:
a transmitter;
a circuit connected to the transmitter, wherein the circuit, in operation, transmits a desired signal from the transmitter; and
a tubular casing in which the transmitter and the circuit are mounted,
the tubular casing including a plurality of tubular casings having a same axis,
the tubular casing having a shortened state in which the tubular casings overlap each other, and
the tubular casing having a lengthened state in which the tubular casings are extended and overlap each other less than the tubular casings overlap each other when the tubular casing has the shortened state, wherein the transmitter and the circuit are disposed in the tubular casing in an end portion of the tubular casing on a pen tip side of the tubular casing when the tubular casing is in the lengthened state.

6. The electronic pen according to claim 5, wherein
the tubular casing includes an innermost casing, one or more intermediate casings located outside of the innermost casing, and an outermost casing located outside of the one or more intermediate casings.

7. The electronic pen according to claim 5, wherein the circuit, a battery, and a switch are disposed in the tubular casing in an end portion of the tubular casing on a side of the of the tubular casing that is opposite from the pen tip side of the tubular casing when the tubular casing is in the lengthened state.

8. The electronic pen according to claim 5, wherein the transmitter includes a core body formed of a conductive material that is electrically connected to a transmitting circuit included in the circuit.

9. The electronic pen according to claim 8, further comprising:

a pen pressure detector which, in operation, detects a pen pressure applied to the core body by being pressed by an end portion of the core body, the end portion being on a side of the core body that is opposite from a side of the core body including a pen tip of the core body, and notifies the circuit of the pen pressure, wherein the circuit, in operation, includes information indicating the pen pressure detected by the pen pressure detector in the desired signal transmitted from the transmitter.

10. The electronic pen according to claim 5, wherein the transmitter includes a resonance circuit including a coil formed of a conductive wire wound around a periphery of a ferrite core that is disposed around a periphery of a core body and a capacitor included in the circuit in parallel with each other.

11. The electronic pen according to claim 5, further comprising:

a receiver which, in operation, receives information from outside of the electronic pen; and a storage device which, in operation, stores the information received through the receiver.

12. The electronic pen according to claim 11, further comprising:

a transmission circuit which, in operation, transmits the information stored in the storage device to an external apparatus.

* * * * *